United States Patent [19]

Dalrymple

[11] 4,137,891
[45] Feb. 6, 1979

[54] ORBITING PISTON ROTARY ENGINE

[76] Inventor: William P. Dalrymple, 415 W. University, Rochester, Mich. 48063

[21] Appl. No.: 818,241

[22] Filed: Jul. 22, 1977

[51] Int. Cl.² .............................................. F02B 53/00
[52] U.S. Cl. .................................... 123/245; 123/206; 418/35
[58] Field of Search ............... 123/200, 241, 242, 245; 418/33, 35, 225

[56] References Cited

U.S. PATENT DOCUMENTS

| 1,317,909 | 10/1919 | Deuel | 123/245 |
| 2,670,688 | 3/1954 | Graham | 418/35 X |
| 3,927,329 | 12/1975 | Fawcett et al. | 418/33 X |

FOREIGN PATENT DOCUMENTS

| 1227082 | 2/1960 | France | 123/245 |
| 496472 | 7/1954 | Italy | 123/245 |

Primary Examiner—Carlton R. Croyle
Assistant Examiner—Michael Koczo, Jr.
Attorney, Agent, or Firm—Willis Bugbee

[57] ABSTRACT

A rotary shaft carries a generally cylindrical composite rotor consisting of an inner cylindrical hub surrounded by a resilient undulatory spring sleeve which in turn is surrounded by a resilient cylindrical spring sleeve. Between the rotor and the internally cylindrical housing is an annular working chamber subdivided into compression and combustion chambers within which multiple cylindrical pistons of slightly greater diameter than the radial distance between the housing and rotor are snugly but orbitally rollable. Tangentially slidable in wedge-shaped recesses in the opposite end walls are upper piston-retarding wedges which are pushed backward into temporary braking engagement with the opposite ends of a leading piston immediately forward thereof in response to the pressure of the exploding gases in the combustion chamber which also propel forward to exhaust ports a piston ahead of the leading piston. Meanwhile a trailing piston behind the wedges, propelled by compressed intake gases, pushes the wedges forward and apart and moves past them. Each piston is also retarded against backward motion by a unidirectional spring-pressed braking clutch mounted in an axial bore therethrough. The compression chamber is supplied with fuel gas through an intake port located circumferentially beyond a lower piston-retarding device located beyond the exhaust ports near the end of the combustion chamber. Timing of the ignition is effected by a make-and-break device operated by one of the upper piston-retarding wedges in timed relationship with the orbiting pistons.

16 Claims, 10 Drawing Figures

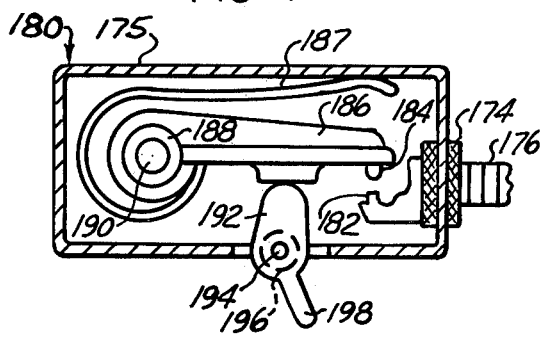
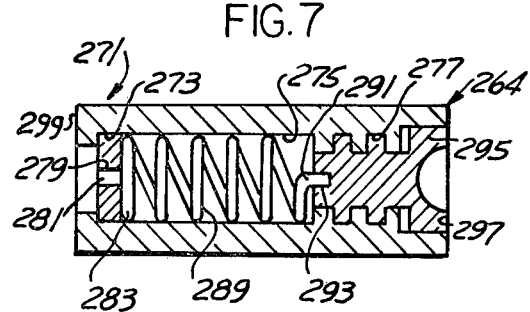
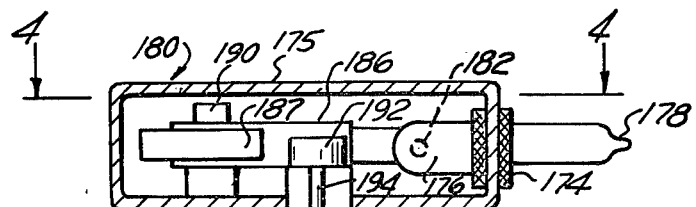
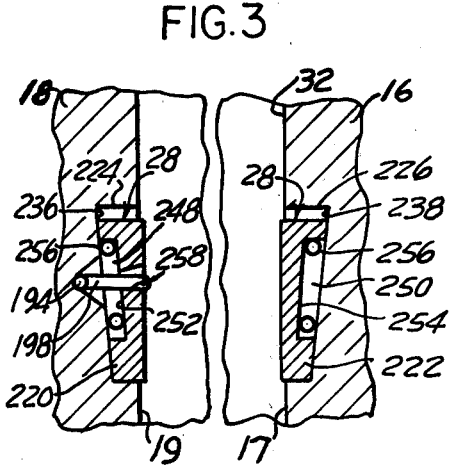
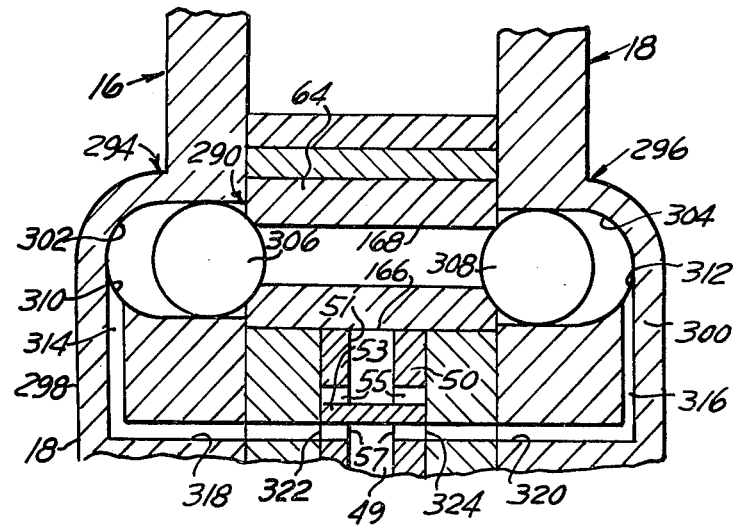

ORBITING PISTON ROTARY ENGINE

SUMMARY OF THE INVENTION

This invention resides in an engine in which the cylindrical pistons are caused to roll in orbital paths in an annular working chamber between the generally cylindrical coaxial surfaces of a stator and a rotor by the explosions of fuel gas introduced into the working chamber while the trailing piston of a pair of such pistons is forcibly prevented by the upper retarding wedges from moving further backward in response to the explosion of fuel gas between it and its leading piston, which as a result is propelled forward thereby. The forward motion of the leading piston rolling circumferentially between the stator and a resilient annular member encircling and drivingly connected to the rotor is thereby converted to rotary motion of the rotor, which in turn rotates a power output shaft. When the leading piston rolls past and thereby uncovers the exhaust port, it is momentarily retarded by the lower piston-retarding device, whereupon the exploded gases escape therethrough. As a consequence, the resulting pressure drop releases both the upper and lower piston-retarding devices so as to permit the pistons to roll forward and thereby draw in or force in a fresh charge of fuel gas from the carburetor or injector, repeating the foregoing cycle.

In the drawings,

FIG. 3 is a fragmentary oblique section, mainly in top plan view, taken along the tangential line 3—3 in the upper portion of FIG. 1, showing a first form of upper-piston retarder and a rotary-cam ignition timing actuator;

FIG. 4 is a top plan view of the ignition timer mechanism of the orbital piston rotary engine shown in FIG. 1, partly in section along the line 4—4 in FIG. 5;

FIG. 5 is a fragmentary cross-section, taken along the radial line 5—5 in FIG. 1, showing the ignition timer mechanism;

FIG. 6 is a fragmentary central vertical cross-section, taken along the line 6—6 in FIG. 1;

FIG. 7 is a fragmentary longitudinal section through a roller piston of FIG. 1, but equipped with a therein-contained second form of piston retarder;

Figures 1, 1A:
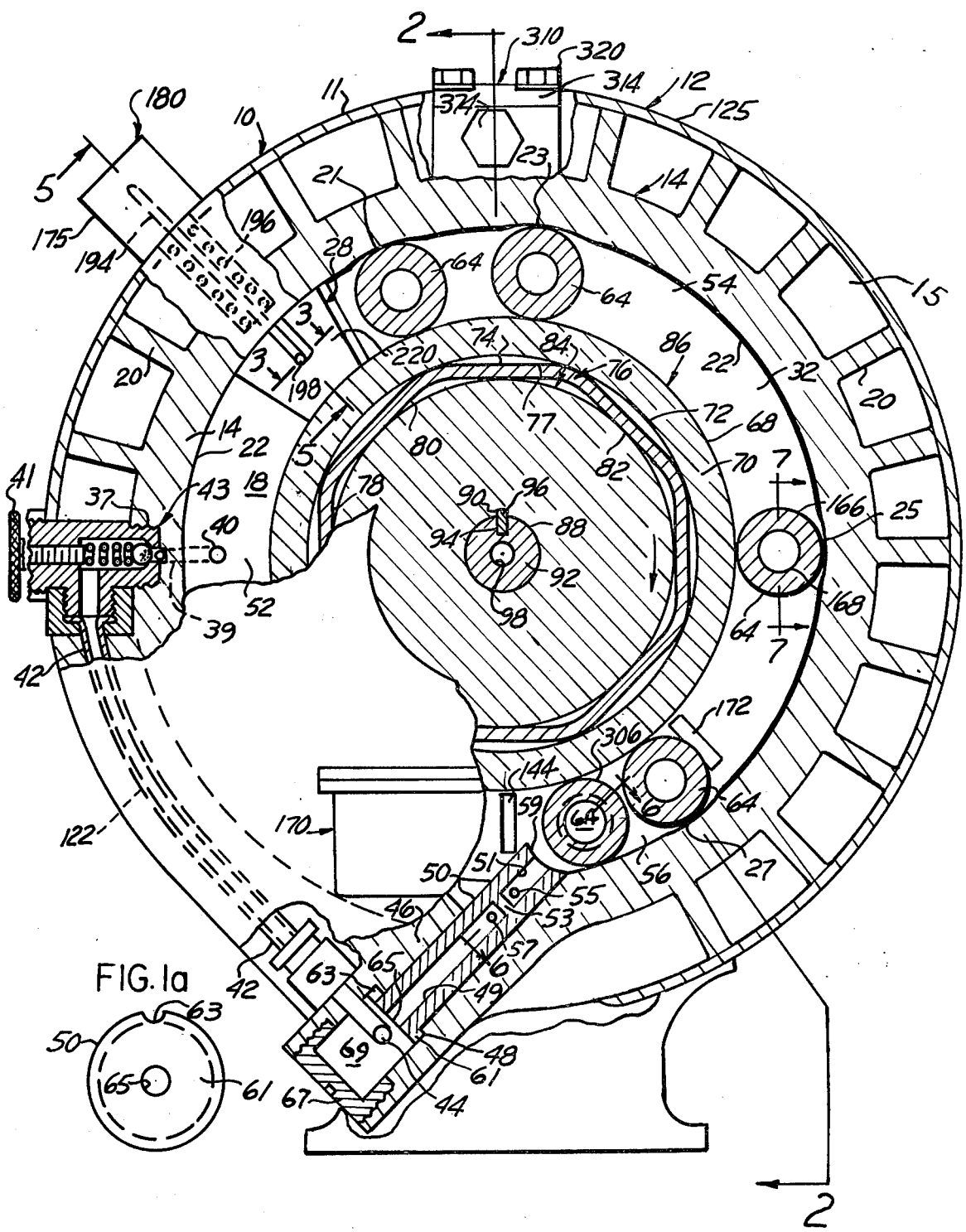
FIG. 1 is a diagrammatic central vertical cross-section, taken along the line 1—1 in FIG. 2 and partly in side elevation, through an orbiting piston rotary engine, according to one form of the invention.
FIG. 1A is an enlarged bottom plan view of the lower piston-retard plunger shown at the bottom of FIG. 1.
Figure 2:
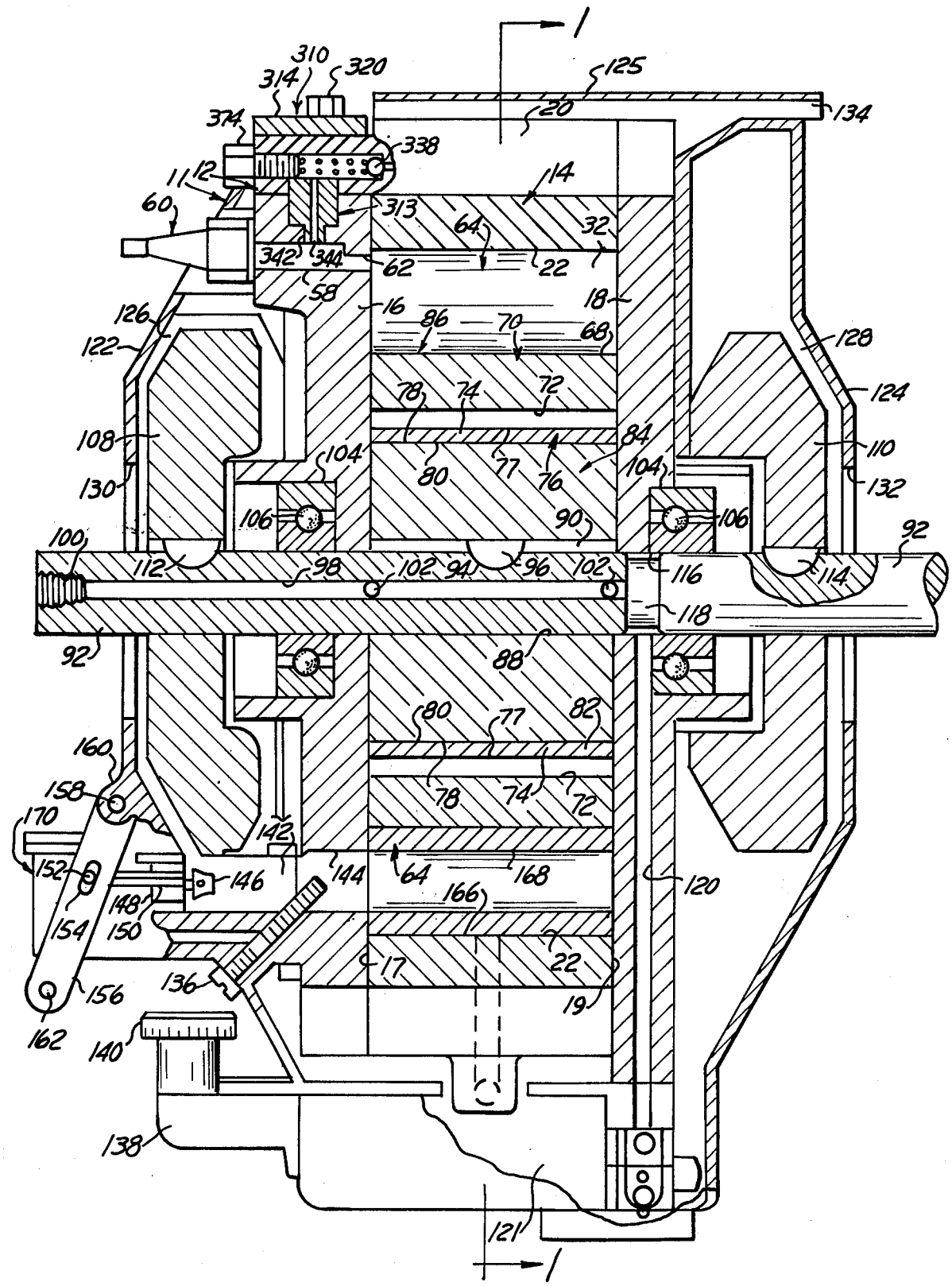
FIG. 2 is a slightly enlarged longitudinal section, taken along the line 2—2 in FIG. 1.

Referring to the drawings in detail, FIGS. 1 and 2 show an orbiting-piston rotary internal combustion engine, generally designated 10, including a cylindrical casing 11 bolted to and containing a housing structure 12 including a hollow cylindrical stator 14 having forward and rearward end heads 16 and 18 with inner surfaces 17 and 19. The stator 14 possesses a cylindrical internal surface 22 relieved slightly at eleven, twelve, three and five o'clock with shallow recesses 21, 23, 25 and 27, and has radial cooling fins 20 thereon with air channels 15 therebetween.

An upper piston retarder 28 is located at ten o'clock in an annular working chamber 32. Mounted in a threaded bore 37 at the outer end of a passageway 39 leading outward through the end head 18 from an inner port 40 is a conventional adjustable spring-loaded ball check valve 43 opening outward and having an adjusting screw 41. A pipe 42 between the end plates 16 and 18 runs downward from the valve 43 through notches in the cooling fins 20 to a port 44 at seven o'clock leading into the lower portion of a lower piston-retard cylinder 46 with a stepped bore 48 opening into the annular working chamber 32 at six o'clock. Reciprocably mounted in the cylinder bore 48 is a hollow lower piston-retard plunger 50 containing lower and upper passageways separated by a partition 53 with upper and lower ports 55 and 57 on opposite sides. The annular working chamber 32 is subdivided into a compression chamber 52 from six to twelve o'clock, a combustion chamber 54 from twelve to four o'clock, and a lower piston-retard chamber 56 from four to six o'clock. The piston-retard plunger 50 has a piston-retarding upper end 59 and an enlarged lower head 61 with a rim notch 63 and a central port 65 for constant flow of gas from the port 44 into the passageway 49.

The forward end plate 16 of the housing structure 12 (FIG. 2) is provided with a bore 58 threaded at its outer end to receive a conventional spark plug 60. The outwardly-threaded bore 58 communicates through a port 62 with the annular working chamber 32 which contains snugly engaging hollow cylindrical pistons 64 rollable in orbital paths therein and with their opposite ends in sliding sealing engagement with the head inner surfaces 17 and 19. The working chamber 32 is formed between the cylindrical inner surface 22 of the stator 14 and the cylindrical outer surface 68 of a hollow cylindrical outer spring sleeve 70, the internal cylindrical surface 72 of which engages the polygonal external surface 74 of a hollow undulatory or polygonal spring sleeve 76 having flats 77 at intervals around its external surface 74. The spring sleeve 76 in turn has an inner polygonal surface 80 mounted on and having flats 78 yieldingly engaging the cylindrical external surface 82 of a cylindrical rotor hub 84.

The rotor hub 84, the flat-sided inner spring 76 and the hollow cylindrical outer spring 70 collectively constitute a composite engine rotor, generally designated 86. The rotor hub 84 is bored centrally at 88 and grooved with a key way 90 to receive a rotary engine drive shaft 92 which is provided with an arcuate key seat 94 to receive a drive key 96 by which the rotor hub 84 and consequently the entire rotor 86 are drivingly connected to the shaft 92. The latter is bored axially with a longitudinal passageway 98 provided at its outer end with a threaded port 100 and near its inner end with a pair of radial lubricant discharge ports 102.

The opposite end plates or heads 16 and 18 are bolted or otherwise secured to the stator 14 and are counter-bored at 104 to receive antifriction bearings 106 in which the drive shaft 92 is rotatably mounted. Also drivingly secured to the drive shaft 92 near the opposite ends thereof are cooling fans 108 and 110 respectively keyed to the shaft 92 at 112 and 114 respectively. The drive shaft 92 adjacent the rearward end plate 18 is provided with an annular reduced diameter portion or groove 116 which furnishes an annular channel 118 into which the inner end of the shaft passageway 98 opens.

Also opening into the annular channel 118 is a transverse lubricant passageway 120 formed within the end plate 18 and extending downward therefrom to a lubricant sump 121 formed in the bottom of the casing 11. The spaced relationship of the casing 11 and housing structure 12 within the generally cylindrical casing shroud 125 provides air intake passageways 126 and 128 between the casing ends 122 and 124, extending outward from central air intake openings 130 and 132 surrounding the shaft 92. Cooling air is drawn inward through the air intake opening 132 by the cooling fan 110 and flows through the channels 125 between the cooling fins 20 to air discharge openings 134. Access to the sump 121 is provided by an L-shaped filling pipe 138 closed at its upper end by a filling cap 140.

Air drawn inward through the air intake opening 130 by the fan 108 also passes downward through a duct 142 and through a fuel gas intake port 144 in the housing structure end plate 16 into the annular working chamber 32. The volume of air admitted to the duct 142 is controlled by a reciprocating control valve member 146 mounted on a wall portion 148 where it is journaled in a bearing bore 150 and pivotally connected by a pin 152 to a slot 154 in a control lever 156 pivotally mounted on a pivot pin 158 which in turn passes through a correspondingly-bored boss 160 on the casing 11. Controlled motion of the lever 156 is accomplished by a suitable linkage (not shown) connected to the hole 162 in the lower end of the control lever 156.

The cylindrical pistons 64 are snugly but rotatably mounted in the annular working chamber 32 between the inner cylindrical housing surface 22 and the outer cylindrical surface 68 of the rotor 86. The pistons 64 are preferably of hollow cylindrical shape to reduce their weight and corresponding inertia and have outer and inner cylindrical surfaces 166 and 168 respectively. The external diameters of the outer cylindrical surfaces 166 are slightly greater than the radial distance between the cylindrical surfaces 22 and 68 so as to cause the resilient cylindrical spring sleeve 70 to yield slightly and distort the undulatory or polygonal spring sleeve 76 as a result of the clearance spaces between the flats 77 and 78 thereon and the internal cylindrical surface 72 of the cylindrical spring sleeve 70 and the external cylindrical surface 82 of the rotor hub 84. As will be seen in connection with the description of the operation of the invention, the cylindrical pistons 64 roll in orbital paths around the annular working chamber 32 against the internal cylindrical surface 22, thereby imparting rotary motion to the rotor 86 by the engagement of the peripheral piston surfaces 166 with the rotor surface 68, analogous to the action of planet pinions rolling between an internal ring gear and a central sun gear in a planetary gear set.

Liquid fuel, such as gasoline, is suitably mixed with air by means of a conventional carburetor, generally designated 170, which is suitably connected by piping (not shown) to a suitable source of liquid fuel, such as a gasoline tank (not shown). The fuel gas and air mixture produced by the carburetor 170 is discharged into the intake duct 142 and thence through the intake port 144 in the lower portion of the side wall 16 into the compression portion 52 of the annular working chamber 32. The intake port 144 in FIG. 2 is located at approximately six o'clock in the annular working chamber 32, and an exhaust port 172 at approximately five o'clock therein. The intake and exhaust ports 144 and 172 in the side wall 16 are opened and closed by the pistons 64 rolling past them, as described below in connection with the operation of the invention. In the annular working chamber 32 the compression portion 52 lies approximately between the intake port 144 and the upper piston retarder 28, whereas the combustion portion 54 lies approximately between the upper piston retarder 28 and the exhaust port 172.

An ignition holder 175 on the top of the casing 11 (FIGS. 1, 2, 4, and 5) is bored to receive a tubular insulator 174 through which extends a rod 176, the outer end 178 of which is adapted to be connected to a source of electricity forming a part of the conventional make-and-break ignition system of the engine 10 and also forming a component of a make-and-break ignition device, generally designated 180. The ignition device 180 (FIG. 4) has a fixed electrode 182 and a movable electrode 184, the latter being mounted on an insulated lever arm 186 urged toward the fixed electrode 182 by a leaf spring 187 secured at its inner end to an arm 186 and pivoted through an insulating bushing 188 to a pivot pin 190. The lever arm 186 is moved back and forth into and out of engagement with the fixed electrode 182 by an oscillating cam 192 mounted on the upper end of an oscillatable L-shaped rod 194 encircled and urged clockwise (FIG. 4) by a torsion spring 196 and extending upward from the working chamber 32 to the cam 192. The rod 194 has an inwardly-projecting lower bent end 198. The cam 192 oscillates the lever arm 186 around its pivot pin 190, by mechanism described below, to open and close the ignition circuit and energize the spark plug 60 to explode the fuel gas charge between a pair of adjacent leading and trailing pistons 64 when the leading piston pushes forward and apart and passes between the spring-pressed piston-retarding wedges 220 and 222 of an upper piston retarder 28 described below and which temporarily prevents backward orbital rolling of the trailing piston 64, as explained below.

The upper piston retarder 28 is disposed between the inner sides 17 and 19 of the end plates or heads 16 and 18 (FIGS. 1 and 3) and adjacent their upper portions where the ignition timing takes place. The upper piston retarder 28 is provided with opposing upper forwardly-thickening piston-retarding wedges, generally designated 220 and 222 (FIG. 3). These are slidably mounted in correspondingly wedge-shaped forwardly-deepening recesses 224 and 226 respectively with bottoms 236 and 238 respectively disposed oblique to the parallel inner faces 17 and 19 respectively of the end plates or heads 16 and 18.

The wedges 220 and 222 are provided with bearing roller recesses 248 and 250 respectively with inclined flat bottoms 252 and 254 parallel to the inclined bottoms 236 and 238 of the recesses 224 and 226. Rollably mounted in the bearing roller recesses 248 and 250 in engagement with the bottoms 252 and 254 thereof and with the inclined bottoms 236 and 238 of the wedge recesses 224 and 226 are bearing rollers 256. The piston-retarding wedge 220 is provided with an opening 258 which loosely receives the lower bent end 198 of the L-shaped rod 194 which thereby is urged clockwise by the torsion spring 196 to move the wedge 220 backward into wedging piston-retarding position, at the same time oscillating the cam 192 to operate the ignition device 180. Meanwhile, the trailing piston 64, while moving backward, is also moved axially by the spring-pressed wedge 220 into endwise engagement with the opposite wedge 222 which it drags backward in the wedge recess 226 until halting of the trailing piston 64 is brought about by the wedges 220 and 222 or by pistons 264 equipped with retarders 271 described below in connection with FIG. 7.

Figure 8:
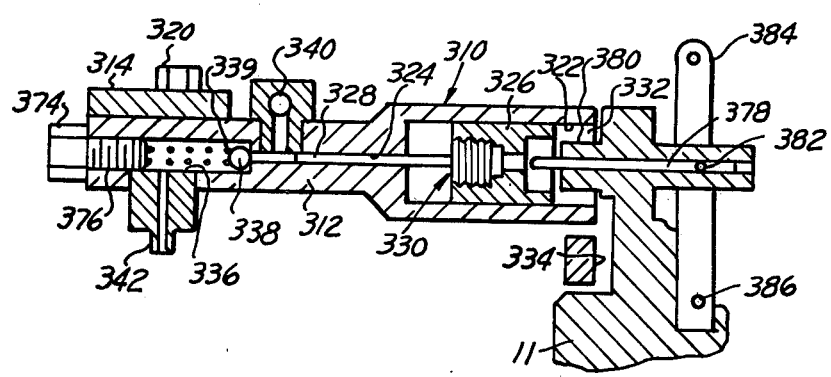
FIG. 8 is a fragmentary longitudinal section through the liquid fuel injector, taken along the upper portion of the line 2—2 in FIG. 1.

To provide for so-called "solid fuel injection" of liquid fuel into the top of the combustion chamber, the fuel line to the carburetor 170 is temporarily shut off by a suitable valve therein (not shown), and the top of the engine 10 is cut away to receive an injector assembly, generally designated 310 (FIGS. 1, 2 and 8). The barrel 312 of the latter is held in a clamp 314 bolted to the housing structure 12 at 320 and contains a large bore 322 opening into a small bore 324. Reciprocable in the bores 322 and 324 are the large diameter and small diameter portions 326 and 328 respectively of a compound liquid fuel injector plunger, generally designated 330. The operating chamber 332 rearward of the large piston portion 330 is connected to the combustion portion 54 of the annular working chamber 32 by a zigzag compressed air inlet passageway 334 through which a portion of highly compressed air from the compression chamber 52 of the engine 10 acting as an air compressor, reaches the large piston portion 326 and drives it forward. This action forces forward the small injection piston portion 328 into a chamber 336 by way of a ball check valve 338 with a spring 339, thereby forcing liquid fuel from the liquid fuel supply passageway 340 and chamber 336 downward through the nozzle 342 into the side port 344 of the main port 62. There the liquid fuel, thus injected into the port 62, becomes vaporized and is ignited by the sparks from the spark plug 60, and causes the leading cylindrical piston 64 to move in a clockwise direction (FIG. 1). At the same time, a portion of the exploding gas pushes the trailing cylindrical piston 64 backward against the piston retard wedge blocks 220 and 222 urged by the coil spring 196 into their rearmost positions in their tapered recesses 224 and 226 into braking engagement with th opposite ends of the trailing piston 64 and preventing the otherwise counterclockwise travel which would be impressed upon the trailing piston 64 by the exploded gas at approximately eleven o'clock. Thus, most of the effort produced by the exploded gas is applied to the leading piston 64 to drive it forward in a clockwise direction, as described below in connection with the operation of the engine 10.

FIGS. 1 and 2 also show the spark plug 60 in the threaded bore 58 communicating with the port 62 in addition to the liquid fuel injector assembly 310 in the engine 10. This spark plug 60 is optional and is an auxiliary means for igniting the compressed fuel gas by the usual electric spark rather than by the high temperature compression alone of the Diesel cycle engine. The spark plug 60 is conveniently used in starting the compression-ignited form of the engine 10. Timing of the spark for the spark plug 60 is also conveniently provided by the same timer 180, described above.

Access to the liquid fuel chamber 336 and to the nozzle 342 is provided by a screw plug 374 threaded into the bore 376 in the housing 314. Manual control of the fuel injected by the compound injector plunger 330 by adjusting the stroke thereof is provided by a piston rod 378. The latter is engageable with one end of the injector plunger 330 and slidably engages a guide bushing 380 which is slotted for the reception of a pivot pin 382 connected to the piston stop rod 378, which is moved backward and forward by a lever 384 pivoted at 386 to the casing 11.

It will be understood that this invention is capable of being embodied in several different forms, depending upon the number of intake and exhaust ports distributed around the annular chamber 32. The engine 10 shown in FIGS. 1 and 2 is a simplified form employing an upper piston-retarder 28, and oppositely located retard plunger 50 and five rolling pistons 64 to produce three explosions per revolution of the shaft 92. With a greater number of pistons 64, a correspondingly greater number of explosions per revolution of the shaft 92 can be accomplished. Furthermore, instead of providing a single pair of inlet and exhaust ports as shown in FIGS. 1 and 2, located at 180 degrees interval, there can be provided two pairs of such ports, with two ignition positions located diametrically opposite one another and with the intake and exhaust ports disposed at 90 degree intervals rather than 180 degrees apart. In such a modified arrangement, the two ignition positions 180 degrees apart are arranged to operate in alternating sequence.

In the operation of the invention, let it be assumed that the carburetor 170 is connected to a suitable source of fuel, such as to a gasoline tank, and that the ignition device 180 is connected into a suitable conventional ignition circuit. Let it also be assumed that the engine drive shaft 92 has been mechanically connected to a suitable starting device such as a conventional electric starting motor and coupling gears. Let it also be assumed that the sump 121 has been filled to a suitable depth with lubricant by way of the filling pipe 138.

The electric starting motor is now operated to rotate the shaft 92 and rotor 86, thereby causing the pistons 64 to roll in an orbital path and to open and close the intake and exhaust ports 144 and 172 while passing thereby, until their entry into the recesses 21, 23, 25 and 27 causes them to lose traction and to rotate momentarily without rolling. In the intake or compression portion 52 of the working chamber 32, the suction caused by the clockwise travel of the pistons 64 between seven and eleven o'clock in FIG. 1 draws fuel gas therein from the carburetor 170 and compresses it.

Meanwhile, the two roller pistons 64 shown at the top of FIG. 1 have just passed between and forced apart the rearwardly spring-pressed wedges 220 and 222 of the upper piston retarder 212 and have entered the recesses 21 and 23. In so doing they have actuated the make-and-break ignition device 180 to energize the spark plug 60 and fire the explosive gas charge between them, forcing them apart from one another in opposite directions out of their recesses 21 and 23 and again into traction, Meanwhile, the torsion spring 196 has rotated the L-shaped rod 194 clockwise so that its bent lower end 198 in cooperation with the rearwardly-moving trailing piston 64 has forced the retard wedges 220 and 222 backward and toward one another in their wedge-shaped recesses 224 and 226 (FIG. 3), and against the opposite ends of said trailing piston 64, halting its counterclockwise backward motion.

Since said leading piston 64 is now free to roll in a clockwise direction it is forced to do so by the pressure of the exploding gases in the space between the leading and trailing pistons 64, causing the leading piston 64 to move in a clockwise direction around the combustion portion 54 of the working chamber 32. In so doing it rolls against the stationary internal cylindrical surface 22 of the stator 14 and transmits its rotary motion to the cylindrical resilient member 70 by way of its external surface 166, causing the rotor 86 to move in a clockwise direction. Meanwhile, the flats 76 on the intermediate spring member 74 permit a slight yielding thereof while at the same time they maintain a driving and sealing engagement between the piston surface 166 and the external surface 68 of the resilient cylindrical member 70. Meanwhile the opposite ends of the roller pistons 64 move orbitally in sliding sealing engagement with the inner surfaces 17 and 19 of the forward and rearward end closure members 16 and 18 of the housing structure 12.

When a following piston 64 in the compression portion 52 of the working chamber 32 thus propelled, passes the port 40 at approximately ten o'clock in FIG. 1, a portion of the thereby compressed fuel gas enters the port 40 and passes downward and backward through the passageway 42, valve 43, and port 44 into the lower retard cylinder bore 48. This action forces the lower piston retard plunger 50 to move upward in its cylinder bore 48, so that its upper end 59 blocks the rolling piston 64 which has just passed and uncovered the exhaust port 172. Thereupon, the high pressure of the exploded gases behind it are discharged through the exhaust port 172. Meanwhile, the pressure of the fuel gas passing downward through the port 40, the passageway 42 and the port 44 into the retard cylinder bore 48 has dropped sufficiently below chamber 54 to release the lower retard plunger 50 and the roller piston 64 temporarily halted by its end 56, thereby leaving the orbital path of the pistons 64 temporarily unimpeded. As the pistons 64 thus freed pass through the compression chamber portion 52 of the annular working chamber 32, they are now caused to rotate and roll orbitally by being driven by the rotation of the rotor 86. As they roll upward from approximately five o'clock to approximately eleven o'clock, they draw in and compress another charge of fuel gas from the intake port 144 leading thereto from the carburetor 170, whereupon the foregoing operation is repeated. Since the rolling cylindrical pistons 64 are always separated from one another during operation by a cushion either of exploded or unexploded gas, no metal-to-metal clashing can occur between them.

Meanwhile, the rotation of the cooling fan 110 by the shaft 92 to which it is keyed forces cooling air outward through the discharge ports 134 by way of the channels 15 between the cooling fins 20, thereby cooling the housing 12. At the same time, lubricant is drawn upward from the sump 121 into the shaft bore 98 by its suction connection with the carburetor 170 and flows by centrifugal force.

Piston retardation in the piston-retard chamber portion 56 between the intake and exhaust ports 144 and 172 at the bottom of the engine (FIG. 1) is additionally provided by an auxiliary lower piston retarder, generally designated 290 (FIG. 6) and mounted in enlargements 298 and 300 of the end plates or heads 16 and 18 and containing ball chambers 302 and 304. These receive reciprocable piston-retard balls 306 and 308 which are slightly larger in diameter than the longitudinal bores 168 in the orbiting cylindrical roller pistons 64. The ball chambers 302 and 304 are provided with ports 310 or 312 connected by a passageway 314 or 316 in the end plate or head enlargements 298 and 300 which in turn communicate with passageways 318 and 320 in the lower piston-retard cylinder 46 leading to ports 322 and 314 which open into the lower piston-retard cylinder bore 48. The ports 322 and 324 alternately communicate with the side ports 55 and 57 of the lower piston-retard plunger 50 during its reciprocation.

The open lower end of the lower piston-retard cylinder 46 is closed by a closure plate or disc 67 secured thereto and forming therewith a lower piston-retard cylinder chamber 69.

The operation of the orbital piston rotary internal combustion engine 10 when equipped with the modified lower piston retarder of FIG. 6 is otherwise similar to that described above in connection with the engine 10 of FIGS. 1 to 3 inclusive, hence is believed to require no repetition.

When the port 40 at approximately ten o'clock is uncovered by a piston 64 passing beyond it, the fuel gases under pressure behind the thus uncovered port 40 pass backward through the passageway 42 (FIG. 1) down to the ports 310 and 312 (FIG. 6). The gas pressure in the recesses 302 and 304 then forces the retardation balls 306 and 308 toward one another into the opposite ends of the cylindrical bore 168 of the hollow cylindrical piston 64 which has arrived at that particular location at that moment. This action halts the last-mentioned piston 64 momentarily piror to its arrival at the intake port 144 yet beyond the exhaust port 172. As a result, the exploded gases pass outward through the exhaust port 172 while the travel of the rolling pistons 64 beyond the halted piston 64 just mentioned causes a suction to arise in the compression portion 52 of the working chamber 66 between approximately seven and nine o'clock, thereby drawing in a fuel gas charge through the intake port 144 into the intake or compression chamber portion 52 of the working chamber 32.

As soon as the exploded gases have exhausted through the exhaust port 172, the consequent drop in pressure in the combustion chamber portion 54 of the working chamber 32 adjacent the piston retarding devices 260 and 294 at approximately six o'clock and ten o'clock respectively releases the piston-retarding balls 306 and 308 and the piston 64 momentarily held thereby (FIG. 6). Meanwhile the torsion spring 196, acting to rotate the L-shaped rod 194 clockwise, retracts and releases the piston-retarding wedges 220 and 222 of the upper piston retarding device 28, thereby also releasing the trailing piston 64 momentarily held by the wedges 220 and 222 (FIG. 3). As a result, all of the pistons 64 now move forward in a clockwise direction in response to their driving connection with the rotor 86, whereupon the foregoing actions repeat one another as described above.

As used herein for conciseness of description of the positions and orbital motions of the rolling pistons 64, by an optical analogy the term "paraxial" means that their axes are disposed parallel to the axis of the rotor 86 and stator 14.

A third form of roller piston retarder, generally designated 271 (FIG. 7), is in the form of an over-running clutch mounted lengthwise within the smooth portion 273 of the bore 275 of each roller piston 264. The smooth bore portion 273 at its inner end joins a coaxial right-hand threaded bore 277. The smooth bore portion 273 contains a paraxial recess 279 in which is secured the paraxial bent end 281 of the oversized end convolution 283 of a torsion spring 289. The axially-directed opposite end 291 of the torsion spring 289 is secured in paraxial socket 293 in an externally-threaded rotary brake block 295 provided with a right-hand thread which smoothly but relatively rotatably engages the right-hand threaded bore 277.

In operation, while the thus-equipped piston 264 rolls forwardly in a clockwise direction (FIG. 1), the torsion spring 289 withdraws the braking surface 297 of the rotary brake block 295 from braking engagement with the adjacent surface of the head 16 or 18, with the result that the roller piston 264 rolls freely around in its orbit within the working chamber 32. When the ignition system sets off an explosion in the combustion chamber 54, however, it drives the trailing piston 264 backward in a counterclockwise direction, whereupon the torsion spring 289 rotates the threaded rotary brake block 295 in its threaded bore 277 so as to bring the braking surfaces 297 and 299 into frictional braking engagement with the adjacent surface of the head 16 and consequently halting the retrograde orbiting and rotation of the trailing piston 264. The explosive force, however, at the same time drives the leading piston 64 forward in the combustion chamber 54 in a clockwise direction.

Figure 9:
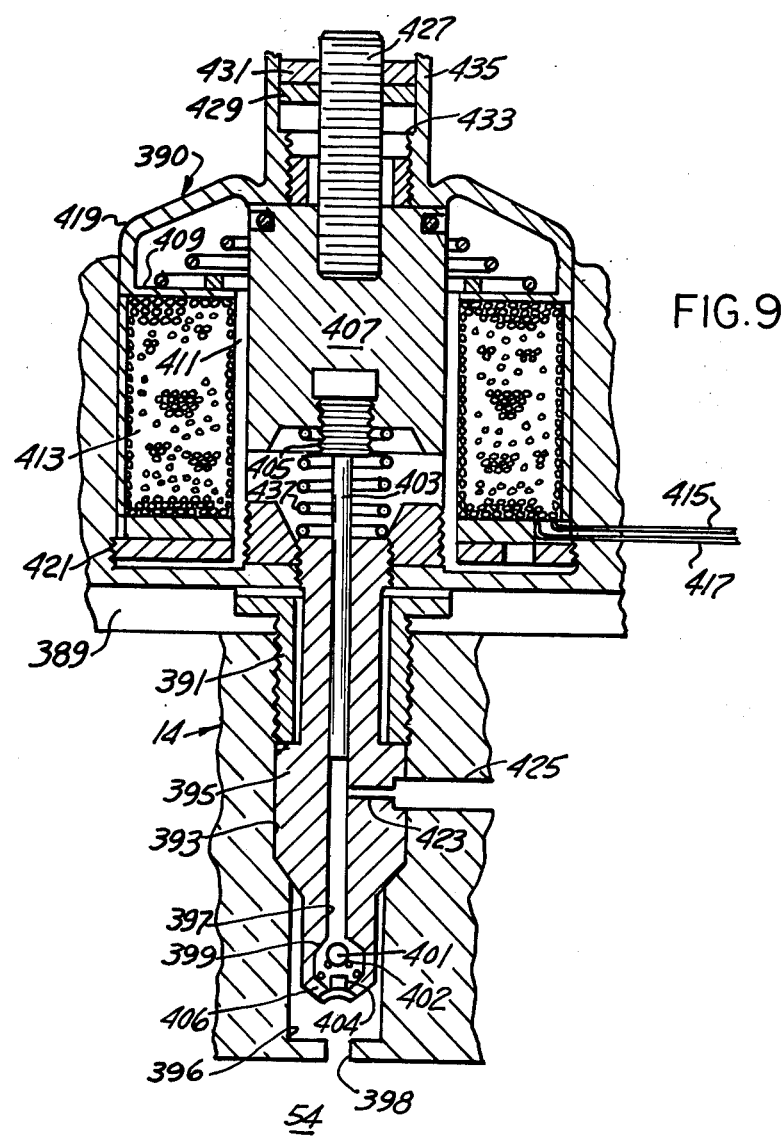
FIG. 9 is a fragmentary longitudinal section through a modification of the upper left-hand corner of FIG. 2, employing a solenoidally-operated liquid fuel injector.

The modified so-called solid fuel injector, generally designated 390 shown in FIG. 9, concisely termed the solenoidal injector 390, replaces the injector 313 described above. It consists of a base 389 which is secured to the stator 14 in any suitable way, such as by a threaded collar 391 clamping its tubular extension 395 into a partly threaded bore 393 continuing in a reduced diameter bore 396 terminating in an outlet port 398 opening into the combustion chamber portion 54 near the spark plug bore 58. The tubular extension 395 contains a reduced-diameter bore 397 terminating in a ball check valve seat 399 engaged by the spring-pressed ball 401 of a ball check valve 402 having a chamber 404 with outlet ports 406 opening into the bore 396. An injector plunger 403 is slidable in the bore 397 and is threaded at its enlarged upper end 405 into the magnetic core or armature 407 of a solenoid, generally designated 409. The armature 407 is slidable within a non-magnetic tubular member 411 which in turn is surrounded by a solenoid winding 413 having lead wires 415 and 417. The lead wire 415 is connected to one terminal of a conventional ignition timing device (not shown) in a conventional ignition circuit (also not shown). The other lead wire 417 is connected to one terminal of the conventional storage battery (not shown) of the conventional ignition circuit.

The armature 407 and solenoid winding 413 are contained in a housing 419 secured to a closure plate 421 which in turn is secured to the base 389. The tubular extension 395 is provided with a transverse passageway 423 communicating with a passageway 425 leading to a source of liquid fuel (not shown).

Threaded into the top of the armature 407 is a threaded stud 427 adapted at its threaded upper end to receive a stroke adjustment nut 429 and lock nut 431 threaded therein and adapted to engage the stop shoulder 433 on the upper extension 435 of the housing 419. A compression coil spring 437 on the closure plate around the injector plunger 403 engages the lower end of the armature 407 and urges the injector plunger 403 upward.

In the operation of the injector 390, the operation of the conventional ignition timer completes the ignition circuit from the battery (not shown) to the solenoid winding lead wires 415 and 417 and this in turn energizes the solenoid winding 413 in that circuit, whereupon the armature 407 is pulled sharply downward into the winding 413, causing the injector plunger 403 to inject a charge of liquid fuel from the fuel intake passageways 425 and 423 downward into the bore 397 past the thereby-displaced spring-pressed check valve ball 401 and through the chamber 402 and ports 406 in a spray which passes downward through the bore 396 and port 398 into the combustion chamber portion 54, where it is ignited by the spark from the spark plug 60, as timed by the conventional ignition timer in the manner explained above.

The orbital piston rotary engine 10, shown in FIGS. 1 and 2, may be adapted to operation by the high-compression ignition of the Diesel principle where the very high compression of the air reached in the combustion chamber creates a correspondingly high temperature according to the well-known Boyle's law of relationship between the pressure, volume and temperature of gases under compression, and this in turn ignites the liquid fuel injected into the combustion chamber at that point in the Diesel cycle.

Temporary retardation of each rolling cylindrical piston 64 at the opposite ends of the combustion chamber portion 54 of the annular working chamber 32 under compression ignition according to the Diesel cycle of operation is provided in the same manner as is shown and described above in connection with the orbital piston rotary engine 10 of FIGS. 1 to 3 inclusive and hence is believed to require no further description. The operation of the compression-ignition Diesel-cycle orbital piston rotary engine 10, insofar as it differs from that of the electric-spark-ignition engine 10 of FIGS. 1, 2, and 3 is believed to have been sufficiently described above in connection with the construction thereof, hence is also believed to require no further description.

The orbiting piston rotary engine of the present invention possesses the following advantages:

1. Its manufacturing cost is the lowest possible because standard machine equipment can be used in its production.
2. All of its main parts are cylindrical, hence involve easy turning, boring or drilling operations.
3. Its materials are predominantly steel and iron.
4. It has a smaller number of parts than conventional internal combustion engines.
5. It has no valves — instead having piston-controlled ports.
6. It is a simple two-bearing low cost unit to assemble.
7. It is without gears or either wobbly or reciprocating motions, hence produces much less vibration than engines utilizing such motions.
8. Its sealing problems are simple.
9. Friction is greatly reduced in it because the cylindrical pistons rolling between the rotor and the stator also act as anti-friction bearings.
10. Its simple cylindrical rotor and its orbiting cylindrical pistons driving the rotor by compound traction comprise all of the moving force-transmitting parts.
11. The compound action and simple construction whereby its rotor is driven by orbiting cylindrical pistons gives it quiet operation and the lowest pollution emission, while its long explosion period in the combustion portion of the working chamber gives it the highest efficiency of operation.
12. Its explosions can be ignited not only by electric spark ignition but also by the high temperature of the air compressed in the engine according to the Diesel principle, with the resulting Diesel engine advantages of lower fuel cost and higher efficiency of operation.
13. By applying power to rotate its shaft, the engine can perform as a pump or compressor.

14. By supplying pressure fluid to this engine from an external source, it will perform as an external pressure engine — example, as a rotary steam engine or an external combustion engine.

I claim:

1. An orbiting-piston rotary internal combustion engine, comprising a housing structure having a stator with a generally cylindrical internal surface therein and having end closure members secured to opposite sides of said stator, a power shaft journaled in said closure members coaxial with said internal stator surface for rotation in a forward direction, a generally-cylindrical rotor rotatably mounted on said shaft and having a generally cylindrical external surface disposed coaxial with said stator internal surface and defining with said stator internal surface and said end closure members and annular working chamber, a multiplicity of cylindrical roller pistons disposed in said working chamber with their opposite ends in sliding sealing engagement with said end closure members and with their axes parallel to the axis of said cylindrical stator and rotor and movable orbitally in said forward direction around said working chamber with their peripheries in snugly rolling engagement with said internal and external surfaces of said stator and rotor respectively and in driving engagement with said rotor external surface, first and second piston retarders disposed in circumferentially-spaced relationship in said housing structure and movable between piston-passing positions and piston-retarding positions in said working chamber and dividing said working chamber into a compression chamber and a combustion chamber, said housing structure having an inlet port communicating with said compression chamber and an outlet port communicating with said combustion chamber, means for introducing a combustible fuel into said combustion chamber, means communicating with said combustion chamber for igniting said combustible fuel therein operable in timed relationship with the passage of a roller piston by said first piston retarder into said combustion chamber, means responsive to the pressure of the burning gases in said combustion chamber for moving said passing piston backward into temporarily-halted position against said first piston-retarder, and means responsive to the pressure of the fuel gases while under compression in said compression chamber for moving said second piston retarder into temporary piston-retarding position in said combustion chamber and responsive to the decline of said pressure of the fuel gases in said compression chamber for releasing said second piston retarder from piston-retarding position in said combustion chamber to piston-passing position relatively thereto.

2. An orbiting-piston rotary internal combustion engine, according to claim 1, wherein said rotor has a resiliently-yieldable peripheral portion provided with said external rotor surface, and wherein said roller pistons have diameters exceeding the radial distance between said internal stator surface and said external rotor surface and thereby providing a yieldable sealing and driving engagement between said pistons and said internal and external surfaces of said stator and rotor respectively.

3. An orbiting-piston rotary internal combustion engine, according to claim 2, wherein said rotor includes a rotor hub, a resilient hollow cylindrical peripheral member coaxial with said hub but spaced radially outward therefrom, and approximately annular spring means disposed in the space between said hub and said peripheral member.

4. An orbiting-piston rotary internal combustion engine, according to claim 3, wherein said spring means is an annular spring member of undulatory configuration encircling said rotor hub.

5. An orbiting-piston rotary internal combustion engine, according to claim 4, wherein said spring member is of generally polygonal outline with its flats externally engaging said hub and with its corners internally engaging said peripheral member.

6. An orbiting-piston rotary internal combustion engine, according to claim 1, wherein said fuel-introducing means comprises means for supplying fuel gas to said fluid inlet port, and wherein said fuel igniting means is spaced circumferentially away from said outlet port in a direction rearwardly therefrom for igniting said fuel gas in said combustion chamber.

7. An orbiting piston rotary internal combustion engine, according to claim 6, wherein said igniting means includes a fuel gas ignition timer electrically connected to said fuel gas igniting means and responsive to the arrival of a piston adjacent said piston retarder for electrically energizing said fuel gas igniting means.

8. An orbiting-piston rotary internal combustion engine, according to claim 6, wherein said first piston retarder includes a pair of wedge-shaped recesses facing toward one another in said housing structure on opposite sides of working chamber rearwardly of said fuel gas igniting means; and also includes wedge-shaped slide members slidably mounted in said recesses and movable rearwardly and laterally toward one another into retarding engagement with the opposite ends of a piston which has rolled therepast and is moved backward thereagainst in response to the pressure of exploding fuel gas against said last-mentioned piston.

9. An orbiting-piston rotary internal combustion engine, according to claim 7, wherein said fuel gas ignition timer includes an electrical make-and-break device mounted on said housing structure and having fixed and movable contacts electrically connected to said igniter through the ignition electricity supply system, and also includes motion-transmitting mechanism extending from said movable contact of said device to one of said slide members and responsive to the motion of said one slide member to actuate said movable contact.

10. An orbiting-piston rotary internal combustion engine, according to claim 8, wherein said slide members on their sides adjacent said wedge-shaped recesses have elongated depressions therein, and wherein antifriction rolling elements are disposed in said depressions in rolling engagement with the adjacent walls of said recesses.

11. An orbiting-piston rotary internal combustion engine, according to claim 6, wherein said cylindrical roller pistons have bores therein extending inward from their opposite ends, wherein said second piston retarder includes a pair of recesses facing toward one another in said housing structure on opposite sides of said combustion chamber forward of said outlet port and having passageways leading from said recesses to said combustion chamber forward of said fuel gas igniting means; and also includes a pair of piston-retarding elements larger than said bores and movably mounted in said recesses and movable toward one another into retarding engagement with the outer ends of said bores of a piston rolling therepast in response to the pressure of exploding fuel gas reaching said recesses through said passageways from said combustion chamber.

12. An orbiting-piston rotary internal combustion engine, according to claim 11, wherein said piston-retarding elements comprise balls rollably mounted in said recesses and rollable toward one another into retarding engagement with the outer ends of said bores.

13. An orbiting-piston rotary internal combustion engine, according to claim 1, wherein a fuel injector is mounted in said stator with a discharge nozzle directed into said working chamber adjacent and beyond said first piston retarder and operable in timed relationship with said igniting means to inject a charge of fuel into said working chamber.

14. An orbiting-piston rotary internal combustion engine, according to claim 13, wherein said fuel injector includes an injector cylinder bore communicating near its forward end with said working chamber through said discharge nozzle, wherein said injector bore near its rearward end has a connection adapted to be connected to a source of liquid fuel, wherein an injector plunger is reciprocably mounted in said injector bore, and wherein said injector bore is connected to said combustion chamber on the opposite side of said plunger from the connection of said injector bore to said connection to the source of liquid fuel.

15. An orbiting-piston rotary internal combustion engine, according to claim 1, wherein said first piston retarder comprises a threaded bore disposed lengthwise of each piston equipped with such retrader, wherein an externally-threaded piston-retarding rotary brake member is rotatably mounted in one end of said threaded bore in rotatable threaded engagement therewith and is movable relatively thereto into an out of braking engagement with said housing structure, and wherein a torsion spring with axially-spaced opposite ends is disposed in said piston bore with one of said ends secured to said piston and with the other of said ends secured to said rotary brake member.

16. An orbiting-piston rotary internal combustion engine, according to claim 14, wherein said fuel injector also includes a solenoid winding mounted thereon and adapted to be connected to a source of intermittently timed electric current, and wherein said fuel injector further includes a solenoid armature reciprocably mounted within said winding and operatively connected to said injector plunger for reciprocation thereof in response to the intermittent electrical energization of said solenoid winding.

* * * * *